(No Model.) W. BRADBURY. 2 Sheets—Sheet 1.
SLEIGH CYCLE.

No. 584,456. Patented June 15, 1897.

WITNESSES
C. Nordfors
C. Gerth

INVENTOR
William Bradbury
BY Edgar Tate & Co
ATTORNEYS (No Model.) 2 Sheets—Sheet 2.
W. BRADBURY.
SLEIGH CYCLE.

No. 584,456. Patented June 15, 1897.

WITNESS:
C. Nordfors
C. Gerst

INVENTOR
William Bradbury
BY
Edgar Tate & Co
ATTORNEYS.

UNITED STATES PATENT OFFICE.

WILLIAM BRADBURY, OF WEST BLOOMFIELD, WISCONSIN.

SLEIGH-CYCLE.

SPECIFICATION forming part of Letters Patent No. 584,456, dated June 15, 1897.

Application filed January 19, 1897. Serial No. 619,723. (No model.)

*To all whom it may concern:*

Be it known that I, WILLIAM BRADBURY, a citizen of the United States, and a resident of West Bloomfield, in the county of Waushara and State of Wisconsin, have invented certain new and useful Improvements in Sleigh-Cycles, of which the following is a specification, reference being had to the accompanying drawings, forming a part thereof, in which similar numerals of reference indicate corresponding parts wherever found throughout the several views.

This invention relates to bicycles and similar vehicles which are adapted for use as sleighs; and the object thereof is to provide an improved sleigh-cycle which is simple in construction and operation and by means of which great speed may be obtained with a minimum application of power, a further object being to provide a vehicle of this class which is adapted to be propelled by both the feet and hands.

The invention is fully disclosed in the following specification, of which the accompanying drawings form a part, in which—

Figure 1:
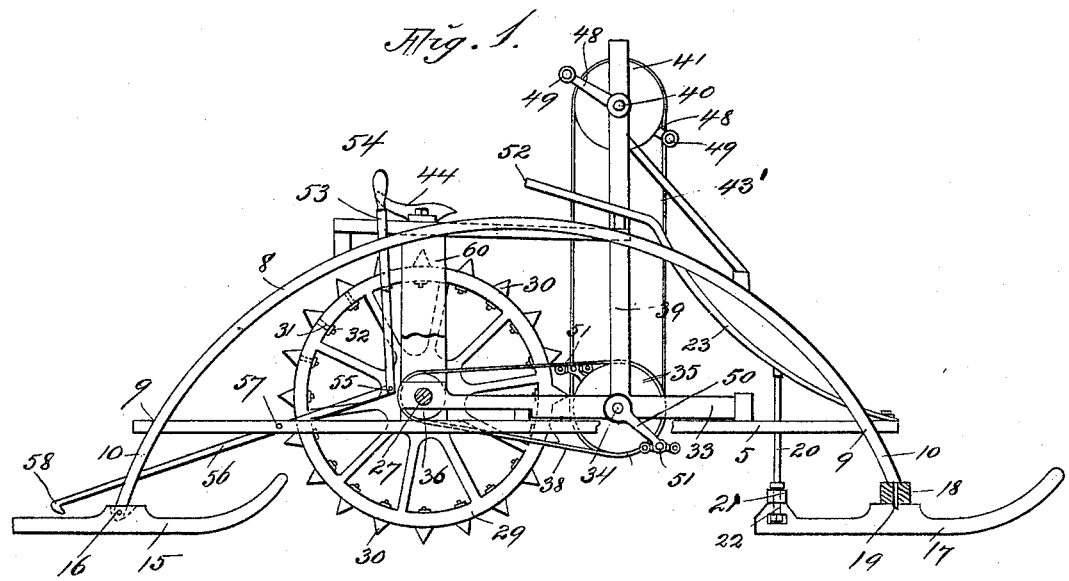
Figure 2:
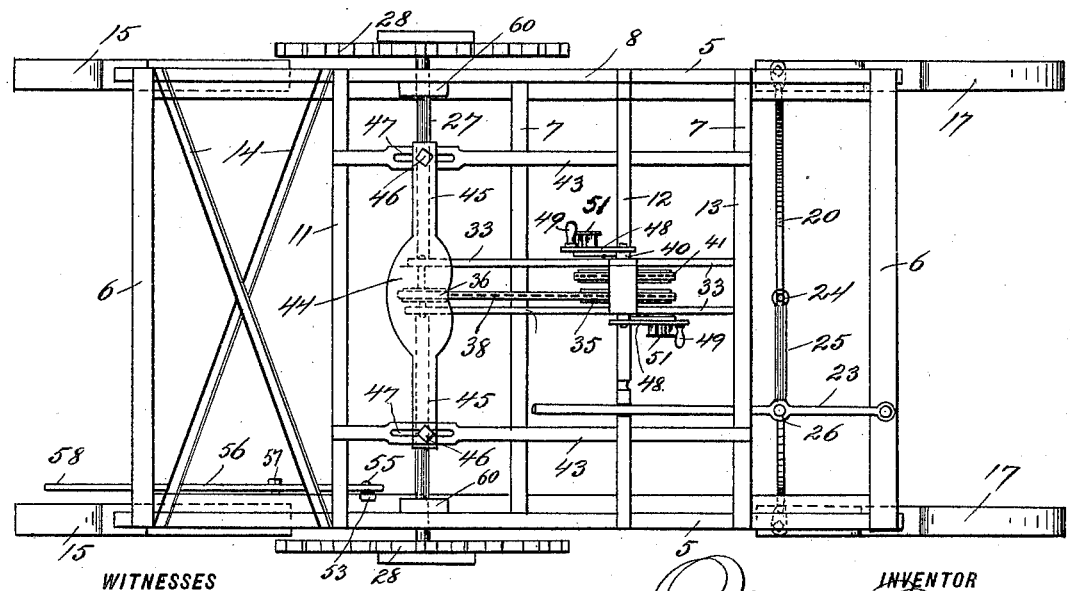
Figure 3:
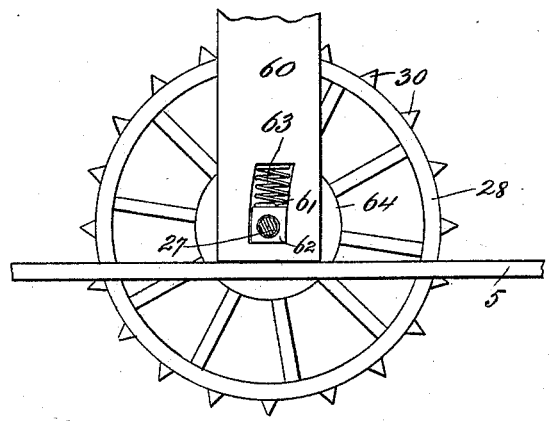
Figure 4:
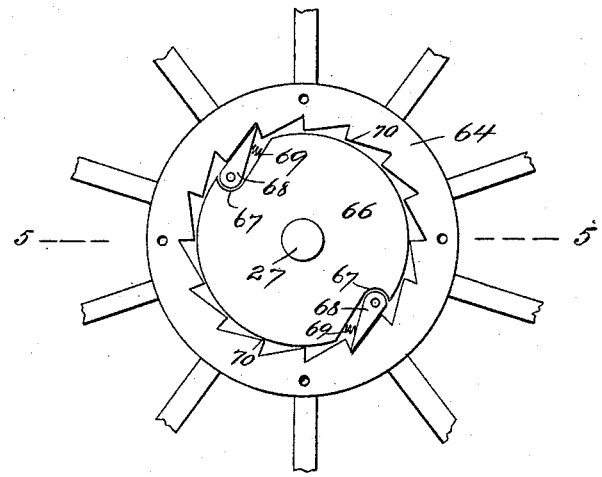

Figure 1 is a plan view of my improved sleigh-cycle, one of the main wheels and a part of the frame being broken away to better show the construction; Fig. 2, a plan view thereof; Fig. 3, an inside view of one of the drive-wheels of my improved vehicle, showing the manner in which it is mounted; Fig. 4, an outside view thereof; and Fig. 5, a section on the line 5 5, showing also a cap or cover plate which is not shown in said Fig. 4.

In the practice of my invention I provide a sleigh-cycle or similar vehicle adapted to be used as a sleigh, and which comprises a main frame consisting of side bars 5, which are united at the ends by cross-bars 6 and centrally by other cross-bars 7, and connected with the ends of the side bars 6 are curved or circular side braces 8, said side braces being connected with the side bars at 9 and being projected below the same at each end, as shown at 10, and the upper portion of the curved or circular side braces 8 are connected by cross-bars 11, 12, and 13 and at the rear end by diagonal cross-bars 14, which serve to brace and strengthen the frame, and the rear ends of said curved or circular side braces 8 are pivotally connected with short runners 15, said pivotal connection being made centrally of the runners, as shown at 16.

The entire frame of the vehicle is adapted to be raised and turned backwardly on the runners 15, and the forward ends of the curved or circular side braces 8 are pivotally connected with runners 17, said runners being provided centrally with blocks 18, which are formed thereon or secured thereto, and said curved or circular side bars or braces being provided with pivot-pins 19, which enter said blocks, and the rear ends of the runners 17, which constitute the guide-runners, are connected by an upwardly-curved cross-bar 20, which at each end is connected with or secured to blocks 21, which are pivotally connected with the rear ends of the runners 17 by means of vertical pins or bolts, as shown at 22, and pivotally connected with the cross-bar 6 of the frame is a lever 23, which projects upwardly and backwardly and which is connected with the upwardly-curved rod 20 and centrally thereof, as shown at 24, by means of a rod 25, which is connected with said lever at 26.

Mounted rearwardly of the central portion of the main frame of the vehicle is a shaft or axle 27, on the outer ends of which are revolubly mounted the drive-wheels 28, and said drive-wheels 28 or the rims 29 thereof are provided with detachable sprockets or teeth 30, said sprockets or teeth being provided with shanks 31, which extend through said rims and on which are mounted nuts or burs 22.

Arranged longitudinally of the main frame and centrally thereof are two parallel bars 33, between which is mounted a supplemental shaft 34, on which is mounted a sprocket-wheel 35, and a corresponding but smaller sprocket-wheel 36 is mounted on the shaft or axle 27, and said sprocket-wheels 35 and 36 are connected by a drive-chain 38, and at each end of the shaft 34 are upright standards 39, between the upper ends of which is mounted a shaft 40, on which is mounted a sprocket-wheel 41, and a corresponding sprocket-wheel is mounted on the shaft 34 adjacent to the sprocket-wheel 35, and said sprocket-wheel and the wheel 41 are connected by a drive-chain 43'.

Arranged longitudinally of the upper part of the frame of the vehicle are two parallel bars 43, which support at their rear ends and directly over the shaft or axle 27 a seat 44, said seat being provided with arms 45, which rest on said parallel bars 43, and the arms 45 are provided with bolts or pins 46, which project through slots 47, formed in said bars 43, and by means of this construction the seat 44 may be adjusted forwardly and backwardly as desired.

The shaft 40, on which the sprocket-wheel 41 is mounted, is provided with cranks 48, having handles 49, and said shaft is adapted to be revolved by the hands, and the shaft 34, on which the sprocket-wheel 35 is mounted, is provided with pedal-cranks 50, on which are mounted pedals 51. It will thus be seen that the shaft 34 may be revolved either by the feet or by the hands, or by both the feet and the hands operating at the same time, and that by the operation of this shaft the shaft or axle 27, on which the drive-wheels 28 are mounted, is revolved, and the revolution of the drive-wheels 28 propels the vehicle, as will be readily understood, and said vehicle may be guided by the lever 23, the rear end of which projects backwardly adjacent to the seat, as shown at 52. I also provide a brake which consists of an upright rod or bar 53, having a handle 54, and the lower end of which is pivotally connected at 55 with a lever 56, which is pivotally connected with the main frame at 57 and which is provided at its rear end with a hook or brake-head 58, which is adapted to be brought into contact with the ice, this operation being accomplished by raising the rod 53, which is adjacent to or at one side of the seat 44.

The shaft or axle 27 is mounted in the lower ends of uprights 60, in which are formed vertical slots 61, and the ends of said shaft pass through vertically-movable journal-boxes 62, above which are placed strong spiral springs 63, and these springs support the frame of the vehicle and jolting and jarring are thus avoided to some extent, and each of the drive-wheels 28 is provided with a hub 64, in the outer side of which is formed a circular chamber 65, in which is mounted a circular disk or plate 66, which is secured to the axle 27, and each of said disks is provided at its opposite sides with a triangular notch or recess 67, in each of which is a pivoted dog 68, beneath the free end of which is a spring 69, and said dogs both project in the same direction and are adapted to operate in connection with oppositely-directed teeth 70, formed on the hub 64 around the chambers 65, in which the disks or plates 66 are mounted. As thus constructed it will be seen that the drive-wheels 28 are revolved on the axle 27 by the disks or plates 66 and the dogs 68 in the forward direction as said axle is revolved and that said wheels are free to turn backward without turning the axle, and this construction facilitates the turning of the vehicle, and I also provide a cap or cover plate 71 for each hub, which are adapted to be secured thereto, as shown in Fig. 5, and which inclose the disks or plates 66 and the dogs 68.

Figure 5:
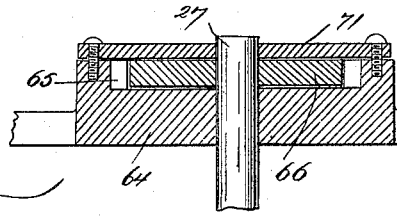

The construction shown in Figs. 3, 4, and 5 is not absolutely essential to my invention and may or may not be employed, and it is evident that changes in and modifications of the construction herein described may be made without departing from the spirit of my invention or sacrificing its advantages.

This device is simple in construction and operation, and by means of the propelling mechanism herein described great speed may be obtained by a minimum exertion of power, and it will also be apparent that the vehicle may be guided as desired by means of the lever 52, by which the forward or guide runners 17 may be turned in either direction whenever necessary.

Having fully described my invention, I claim as new and desire to secure by Letters Patent—

1. A sleigh-cycle or similar vehicle adapted for use as a sleigh, which consists of a suitable frame, which is provided at its rear end with two runners with which it is pivotally connected, and at its forward end with two runners, which are pivotally connected therewith, and adapted to be turned laterally, said frame being also provided with a main shaft or axle on which are mounted two drive-wheels, the rims of which are provided with sprockets or teeth, and means for turning said shaft or axle, consisting of a supplemental shaft mounted in front thereof, and provided with a sprocket-wheel which is adapted to be connected with a sprocket-chain, said supplemental shaft being also provided with pedal-cranks and pedals, substantially as shown and described.

2. A sleigh-cycle or similar vehicle, adapted for use as a sleigh, consisting of a suitable frame, which is provided at its rear end with two runners with which it is pivotally connected, and at its forward end with two runners, which are pivotally connected therewith, and adapted to be turned laterally, said frame being also provided with a main shaft or axle on which are mounted two drive-wheels, the rims of which are provided with sprockets or teeth, and means for turning said shaft or axle, consisting of a supplemental shaft mounted in front thereof, and provided with a sprocket-wheel on said shaft or axle by means of a drive-chain, said supplemental shaft being also provided with pedal-cranks, and pedals, and said main frame being also provided with a suitable seat, and with upright standards in which is mounted another shaft, provided with cranks and handles, and a sprocket-wheel which is connected by a drive-chain with a corresponding sprocket-wheel on the supplemental shaft, substantially as shown and described.

3. A sleigh-cycle or similar vehicle, adapted for use as a sleigh, consisting of a suitable frame, which is provided at its rear end with two runners, with which it is pivotally connected, and at its forward end with two runners which are pivotally connected therewith, and adapted to be turned laterally, said frame being also provided with a main shaft or axle on which are mounted two drive-wheels, the rims of which are provided with sprockets or teeth, and means for turning said shaft or axle, consisting of a supplemental shaft mounted in front thereof, a sprocket-wheel mounted thereon, and connected with a sprocket-wheel on said main shaft or axle, by means of a drive-chain, said supplemental shaft being also provided with pedal-cranks and pedals, and said main frame being also provided with a suitable seat, and with upright standards in which is mounted another shaft, provided with cranks and handles, and a sprocket-wheel which is connected by a drive-chain with a corresponding sprocket-wheel on the supplemental shaft, said vehicle being also provided with a brake and with a lever by which the forward runners are turned in guiding the vehicle, substantially as shown and described.

4. A sleigh-cycle or similar vehicle, adapted for use as a sleigh, which consists of a suitable frame, which is provided at its rear end with two runners, with which it is pivotally connected, and at its forward end with two runners which are pivotally connected therewith and adapted to be turned laterally, said frame being also provided with a main shaft or axle on which are mounted two drive-wheels, the rims of which are provided with sprockets or teeth, and means for turning said axle or shaft, said drive-wheels being adapted to revolve with said shaft in a forward direction, and independently thereof, in a backward direction, substantially as shown and described.

In testimony that I claim the foregoing as my invention I have signed my name, in presence of the subscribing witnesses, this 7th day of January, 1897.

WILLIAM BRADBURY.

Witnesses:
HENRY KLEIST,
JACOB J. STEIGER.